Aug. 30, 1927.

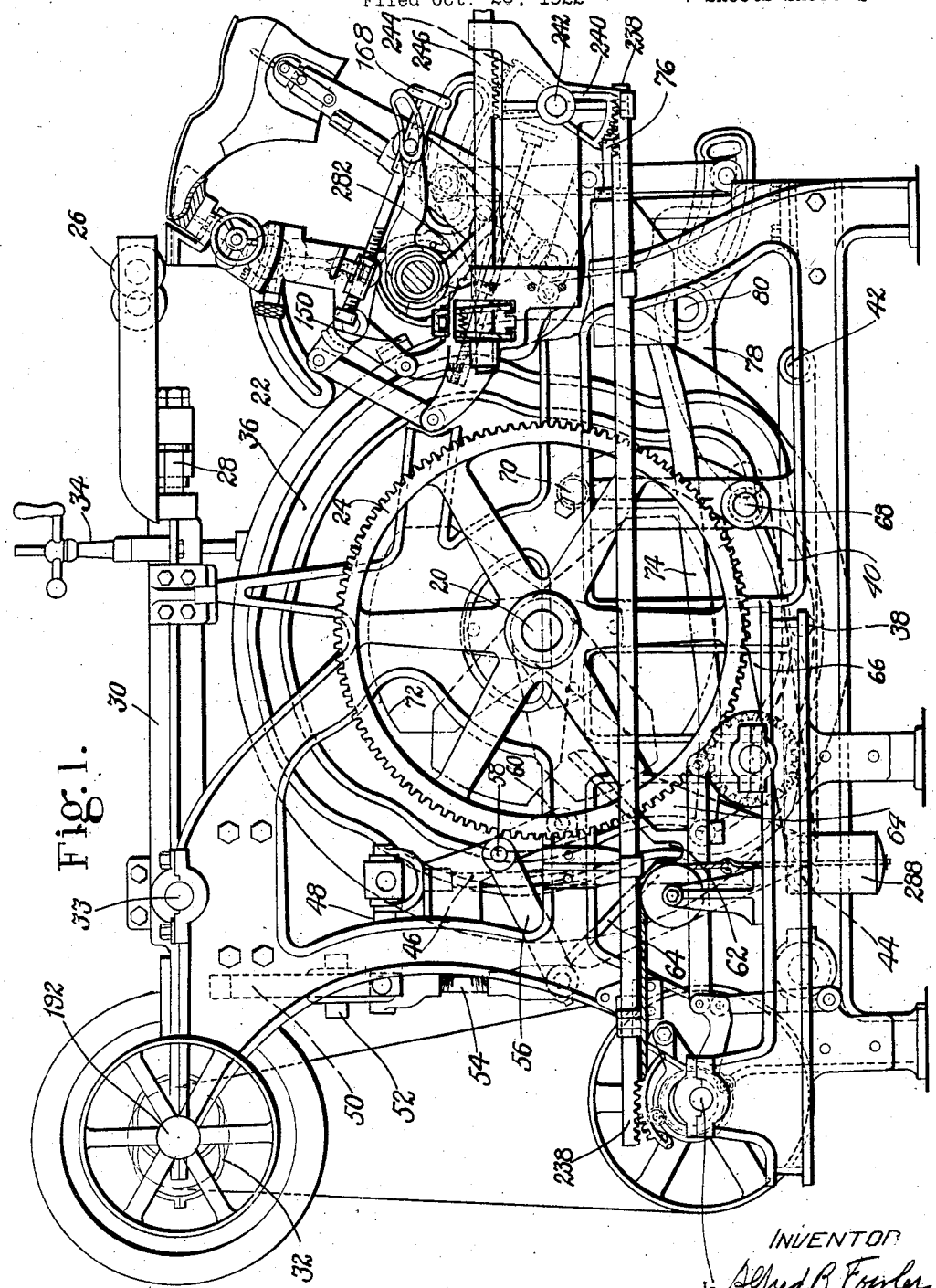

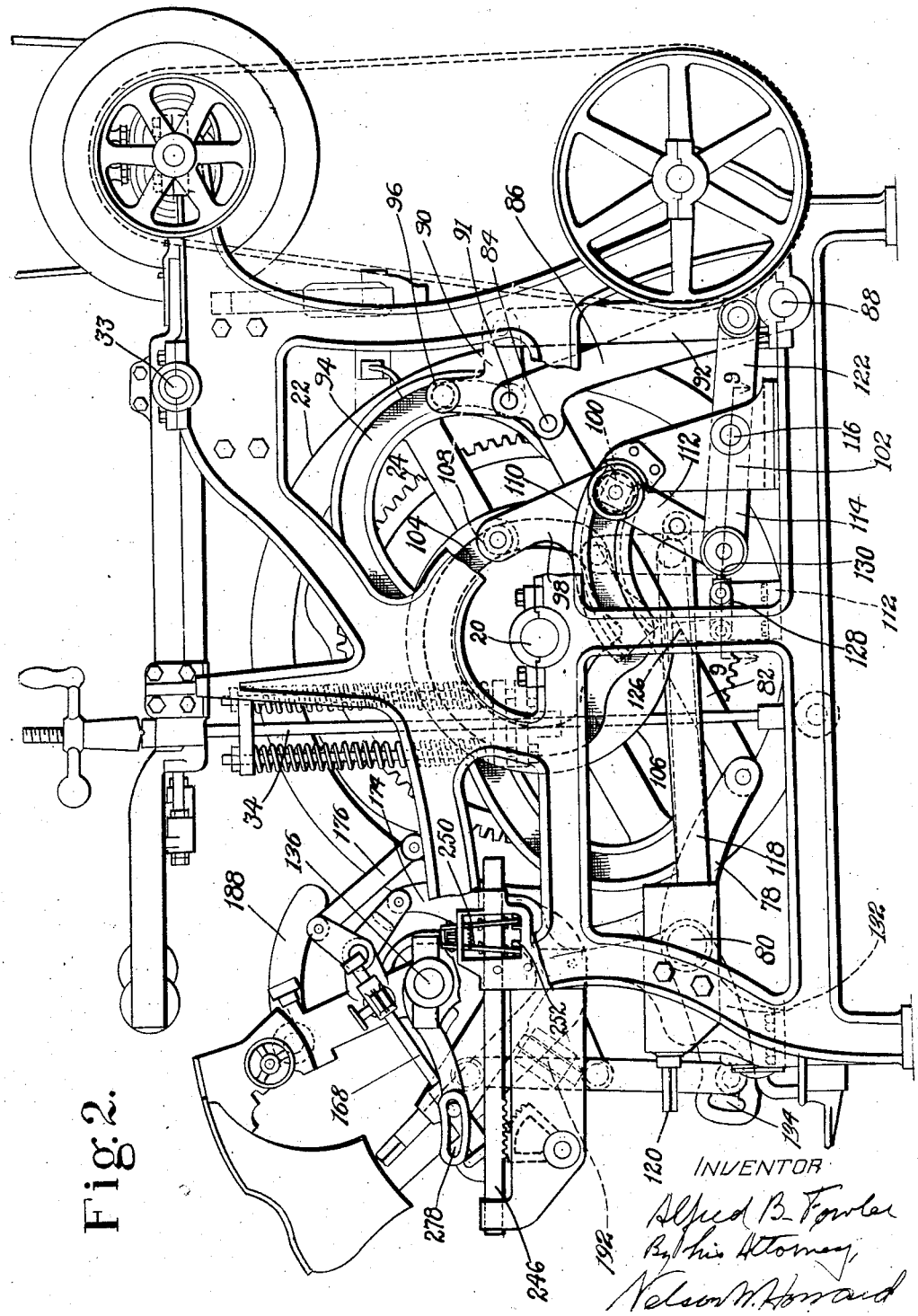

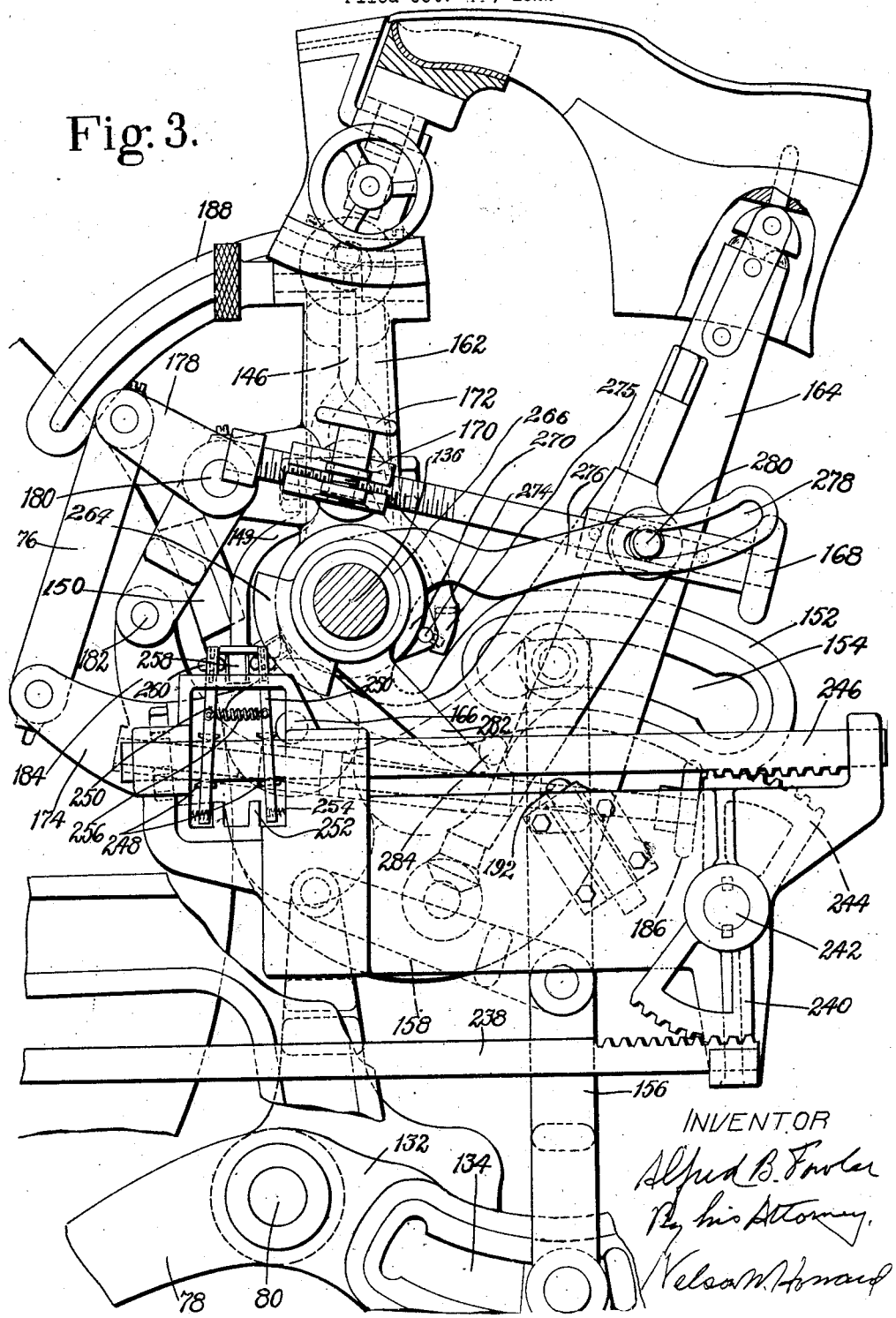

A. B. FOWLER 1,640,353

MACHINE FOR PRESSING SOLES

Filed Oct. 26, 1922

INVENTOR
Alfred B. Fowler
By his Attorney,
Nelson W. Howard

Aug. 30, 1927.  
A. B. FOWLER  
MACHINE FOR PRESSING SOLES  
Filed Oct. 26, 1922    7 Sheets-Sheet 5

1,640,353

INVENTOR  
Alfred B. Fowler

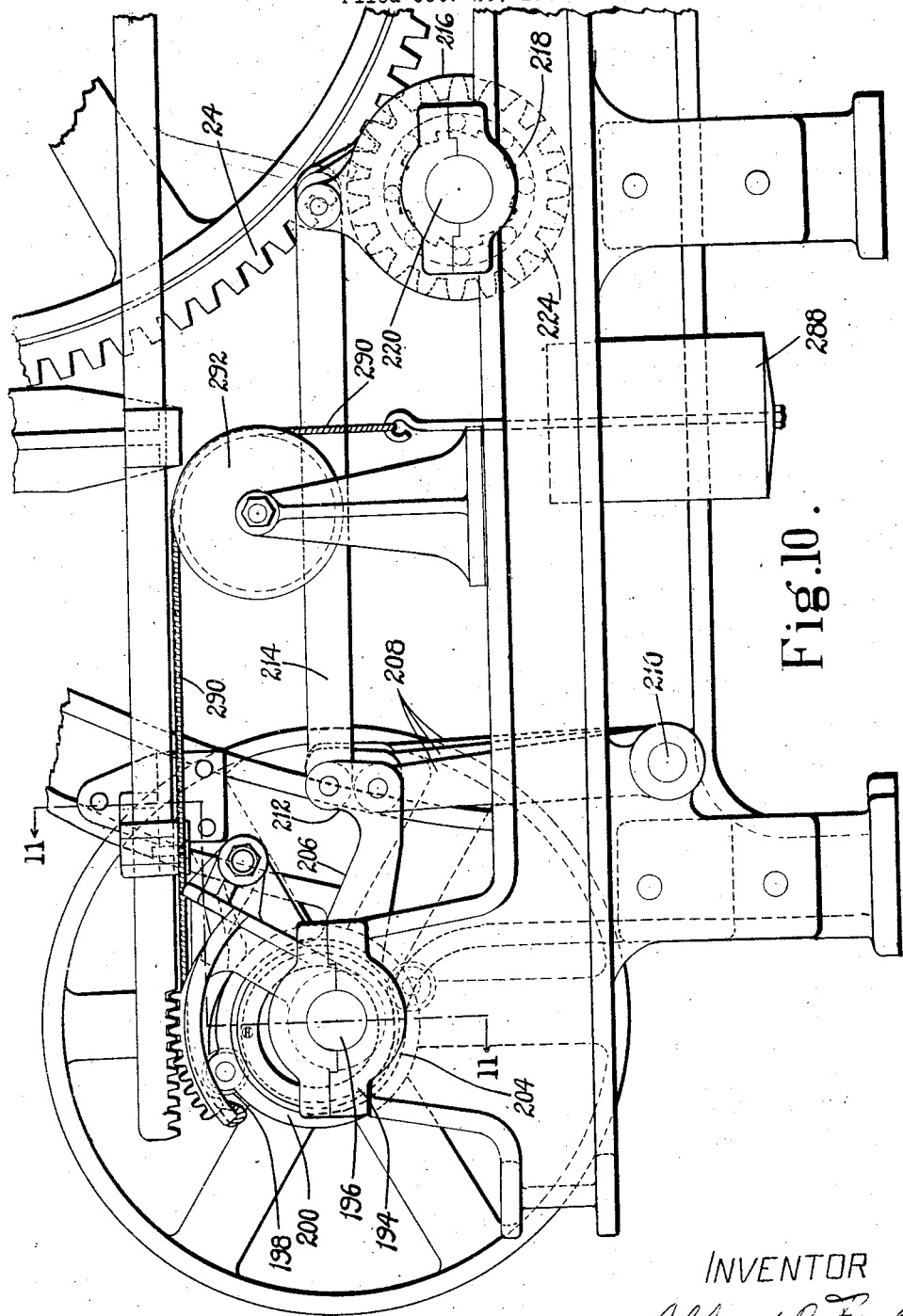

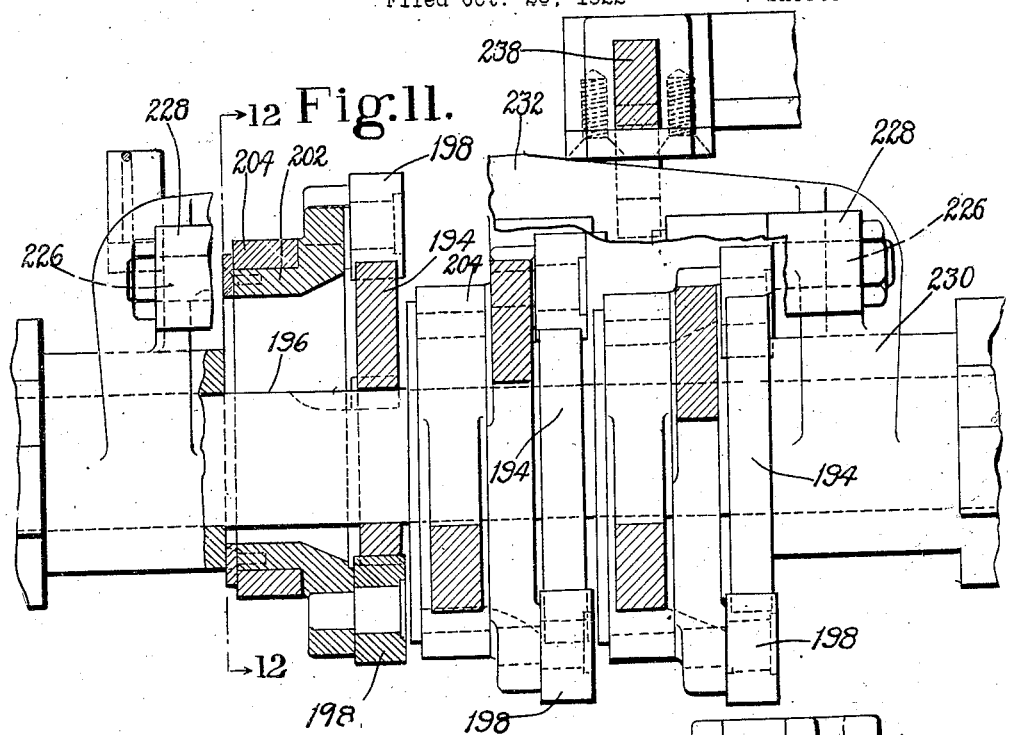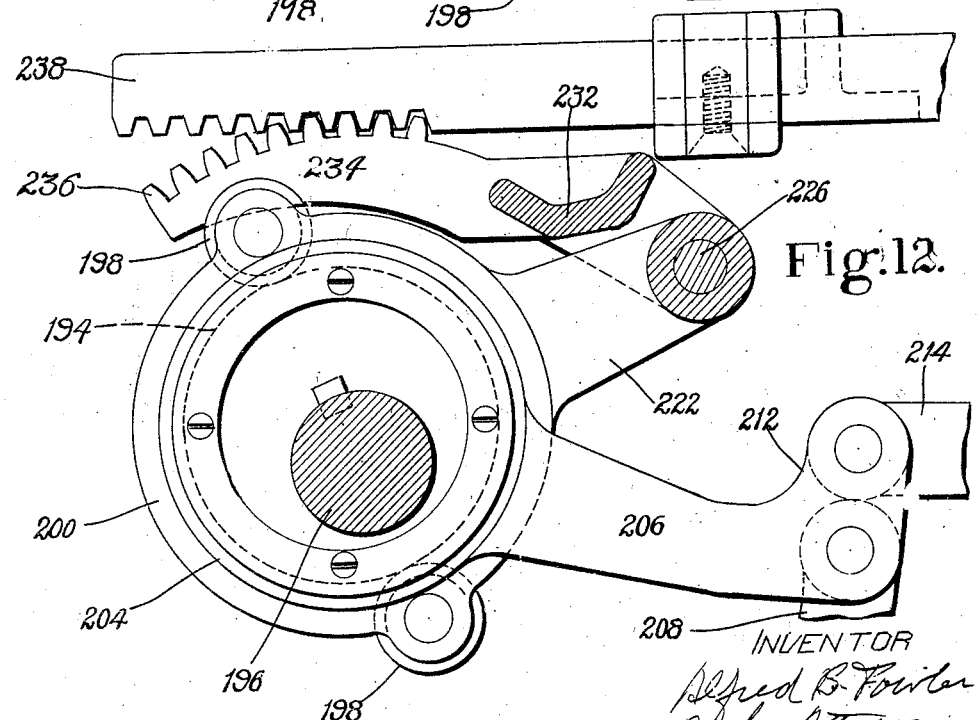

Patented Aug. 30, 1927.

1,640,353

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR PRESSING SOLES.

Application filed October 26, 1922. Serial No. 597,151.

The present invention relates to machines for pressing the soles of boots and shoes and is disclosed as embodied in a so-called automatic leveling machine having an automatically controlled relatively vibrating jack and leveling tool. This application is a continuation of my application Serial No. 295,152, filed May 6, 1919 as regards all subject-matter common to the two.

In machines of this type now in use, the length of the leveling cycle is invariable, being the time of revolution of a main control cam shaft. Thus it takes the same time to level a small shoe that it does to level a large one, and consequently there is a great disparity between the amount of leveling energy and the time expended on some shoes, and the amount properly required. Accordingly it is an important object of the present invention to provide an improved speed regulating mechanism or speed control which will adjust the expenditure of leveling energy to the shoe upon which it is exerted.

A feature of the invention resides in an energy regulating mechanism or speed control adjusted automatically in connection with the initial adjustment of the jack to the length of the shoe, so that no attention to the matter as such is required on the part of the operator. In accordance with this feature of the invention, the illustrated speed regulating mechanism provides for a substantially uniform expenditure of energy on corresponding portions of the treated surfaces of different shoes, irrespective of the lengths of the shoes.

Another, and a very important, feature of the invention resides in a co-ordination between this energy regulating mechanism, and certain other adjustable mechanisms such as are employed in automatic leveling machines. Such machines, as generally constructed have three important mechanisms of this kind; which may be briefly characterized as follows: 1. The jack throw is made equal to the length of the surface to be leveled (this adjustment being generally effected by setting the jack to fit the shoe); 2. The amount of the tipping of the leveling roll about an axis extending generally in the direction of the long axis of the shoe is independently adjustable as the roll treats the inside and outside shank and forepart, and changes automatically as the leveling roll passes the break at the ball line of the shoe; 3. The position of this change in the roll tip as related to the total longitudinal jack movement, is adjustable so that the change in the roll tip is adjustable longitudinally of the sole of the shoe and preferably on its inside and outside independently, to follow changes in position of the ball lines of shoes due to variations in style and size. These adjustments are vital to good leveling, and it is desirable that they co-ordinate properly, and preferably remain undisturbed by the speed or energy control mechanism above discussed, and accordingly a very important feature of the invention consists in an organization comprising adjusting mechanism of the character referred to together with energy or speed-controlling mechanism constructed and arranged relatively to each other so that they will be properly co-ordinated and further so that the energy or speed-controlling mechanism will in no wise prejudicially affect or hamper the operation of the adjusting mechanism.

Another of the objects of the present invention is to provide an improved sole leveling machine which shall require a minimum amount of skill and attention from the operator.

With this object in view, a feature of the present invention contemplates the provision in a sole leveling machine, of novel and improved means for automatically stopping the mechanism for relatively actuating the leveling device and jack at the completion of the leveling operation and for automatically throwing said mechanism into operation when the jack is moved into operative position.

These and other features of the invention comprising certain combinations and arrangements of parts will be understood from the following description of a preferred embodiment thereof selected for purposes of illustration and shown in the accompanying drawings.

In the drawings,

Fig. 1 is a left side elevation;

Fig. 2 is a right side elevation;

Fig. 3 is an enlarged detail of the jack mechanism, seen from the left;

Fig. 10 is a left side elevation of the speed control mechanism;

Fig. 11 is a section on the line 11—11 of Fig. 10;

Fig. 12 is a section on the line 12—12 of Fig. 11.

Figure 5:
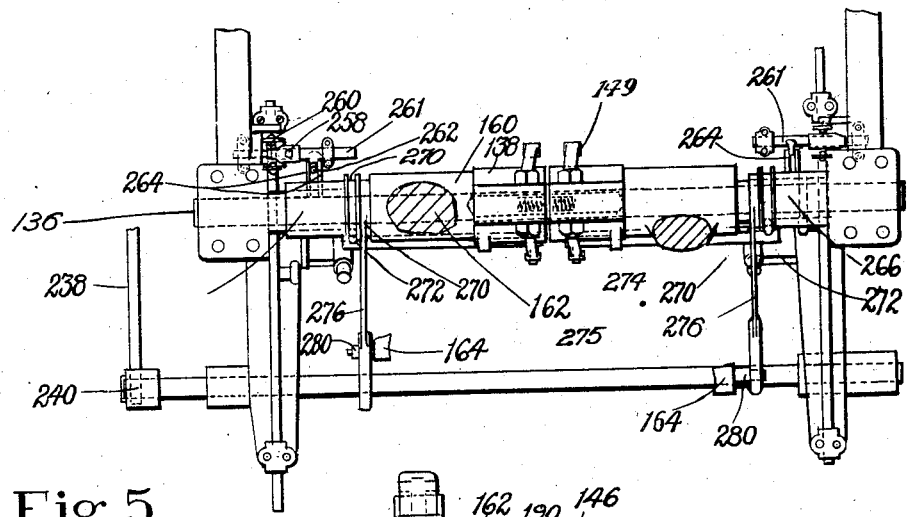
Fig. 5 is a plan view of a part of the mechanism shown in Fig. 4.

The main shaft 20 is mounted transversely in the frame, and carries a cam disk 22 which controls the operation of the machine, and is driven by a gear 24 in a manner to be described below. The leveling rolls 26 are mounted on spindles 28 which are longitudinally oscillatable in arms 30 by eccentrics 32 in a manner well known to those versed in the art. The arms 30 are pivoted at 33 in the machine frame, for vertical movement, and are resiliently held down to impose pressure on the shoes by an adjustable spring device 34.

The spindles 28 are oscillatable about their axes in order to tilt the rolls, by any convenient mechanism such as that shown in the Winkley Patents 555,548, March 3, 1896, and 889,287, June 2, 1908. This mechanism is shown herein somewhat incompletely, to avoid undue masking of the novel mechanical parts disclosed, and reference may be made to the patents named for a fuller disclosure.

A path cam 36 on the cam disk operates a roller 38 on a lever 40 pivoted at 42 in the frame. To the rear end of this lever 40 is pivoted at 44 a link 46 the upper end only of which is indicated in dotted lines in Fig. 1, which operates a bell crank pivoted at 48 and having a vertical arm at 50. A link 52 vertically adjustable along this arm at one end is connected at the other to the roll tipping mechanism as shown in the patents referred to. The adjustment is effected through a link 54 jointed at its lower end to a bell crank 56 pivoted at 58 on the frame and having a long roll 60 extending perpendicular to the plane of the paper in Fig. 1, at its other end. This roll is engaged in turn by notches 62 in a series of winged plates 64 which are pivotally mounted at the ends of bell crank levers 66 pivoted at 68 and having rollers 70 at their other ends. These rollers are engaged respectively by cams 72, mounted on the shaft 20 and spaced around it. The winged plates can be swung forward and backward by links 74 adjustable by square headed screws 76.

The cam 36 is designed to give the rolls generally the sort of tipping movement desired in connection with the long and short traverses produced by the jack oscillating mechanism throughout the cycle of the machine, which is one revolution of the shaft 20. The cams 72, shown as four in number corresponding to the traverse of the leveling roll over the inside and outside of the forepart and shank, are designed to come into play on the rollers 70 at the time these traverses are being made on the shoe. They throw up the winged plates one after the other, so that the corresponding notch 62 catches on the roller 60, and swings the bellcrank 56 to adjust the link 52 on the arm 50, thus defining accurately the tipping movement of the leveling roll. The position of the notch 62 is defined by the corresponding adjustment at 76. All of the above described mechanism is well known and will be found treated more fully in the above-mentioned patents.

The jack operating mechanism is best seen from the other side of the machine (Fig. 2). This mechanism in itself is not novel, and will be somewhat briefly described. It will be found treated more fully in the Winkley Patent 1,011,301, Dec. 12, 1911. The jack movement is produced by the movement of an arm 78, integral with the rock-shaft 80 in the frame. This arm is swung by a link 82 pivoted at 84 to a link 86, the lower end of which is pivoted on the frame at 88. A bell crank 90 is pivoted at 91 to the link 86 and has one of its ends pivoted to a link 92 and its other end engaging a main jack cam 94 on the disk by means of a roller 96. Assuming, for the moment, the lower end of the link 92 as on a fixed pivot in the frame, the cam 94 will swing the bell crank 90 and the links 92—86 which, through the link 82, will operate the jack operating lever 78.

The cam 94 is designed to produce generally the jack movement desired, which will consist of long traverses from the toe to the rear end of the shank, and of short traverses terminated at one end by the ball line or junction of the shank and forepart, and its effect is modified by a mechanism now to be described.

Figure 9:
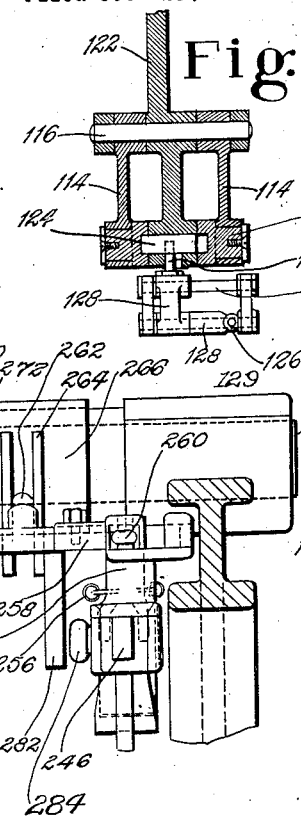
Fig. 9 is a section on the line 9—9 of Fig. 2.

A bell crank 98 is pivoted at 100 on a frame standard 102. One of its arms engages a cam 104 on a small disk 106 mounted on the shaft 20, by means of a roller 108. Its other arm is a circular segment 110 having a suitable slot in which the end of a link 112, the lower end of which (see also Fig. 9) is pivoted to a link 114 pivoted at its other end to the standard 102 at 116, is adjustable by the link 118 and adjusting screw 120. All of the parts 98—120, above described, are duplicated, one set lying just behind the other in Fig. 2, except that the two links 112 are shown in different adjustment on their segments.

The lower end of the link 92 (which was tentatively assumed above as on a fixed pivot) is really pivoted on the end of a lever 122, pivoted at 116 and extending forwardly between the links 114. A pin 124 is arranged in its forward end, which can be slipped endwise across the lever to pin it to the pivotal junction of either of the link pairs 112—114 in turn. This pin is shifted by a peripheral cam on one of the disks 106 engaging a roller 126 on a horizontal slide 128, running on guides 129, having a vertical slot in which the head of a pin 130 mounted in the pin 124 can work.

If the link 112 to which the lever 122 is pinned is adjusted so that its upper end is anywhere except at the center 100, the corresponding cam 104 will rock the lever 122 and swing the bell crank 90 about the roll 96 as center, thereby imparting a movement to the link 82, which is compounded with that due to the cam 94, when the lever 122 is regarded as fixed.

An important use for this mechanism is in locating the point of junction between the shank and forepart. The cam 94 is in many instances constructed to effect short traverses at times over the shank alone or over the forepart alone. It is necessary that these stop at just the right place in order to shape the ball point properly. The proper design of the cams 104, and the proper adjustment at 120 (for length of shoe) will modify the jack movement produced by the main cam so as to put the shoe in just the right position at the ball point end of a short traverse, but need not substantially affect the time in the cycle at which a reversal of movement of the jack takes place. Although this time can be governed, if desired, by proper design, the mechanism is used mainly to locate the ball point properly. This matter is of importance for another reason, which is that the tilt of the leveling roll is changed as the roll passes over the ball point. This change in tilt takes place at a definite time in the cycle, and it is advisable that the ball point of the shoe be under the roll as it changes its tilt.

The duplication of the mechanisms 98—120 is necessitated by the difference in position of the ball point on the inside and outside of the sole. The pin 124 joins the lever 122 to one link 114 when the outside of the shoe is being treated and to the other when the inside is being treated in the other half cycle. Thus the inside and outside ball points can be separately adjusted. The two cams 104 are preferably alike, but set 180° apart, and each is inoperative during about a half cycle. These cams are also formed so that at the end of a half revolution of the main cam disk, when the roll is at the toe of the shoe, the cam rollers 108 are in the same coaxial position. Thus the segments 110 are concentric, at this instant, and the pin 124 will slide freely from one link 114 to the other irrespective of difference in adjustment of the links 112 in the segments.

Figure 4:
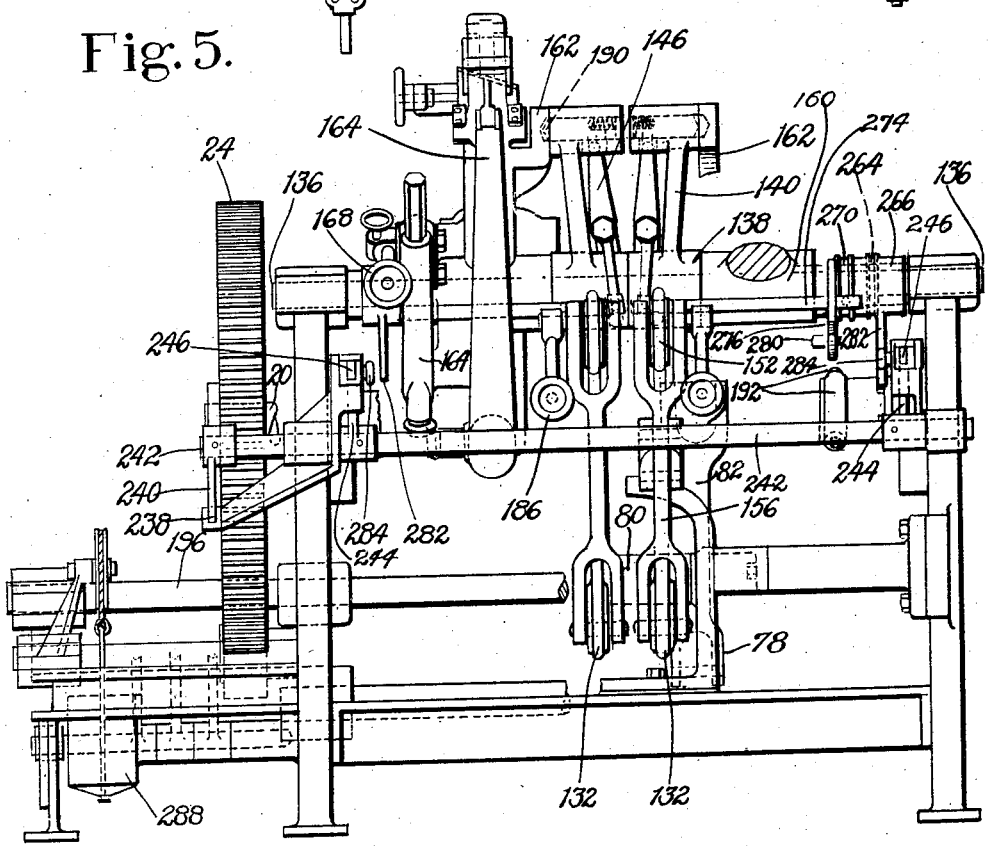
Fig. 4 is a front elevation.
Figure 6:
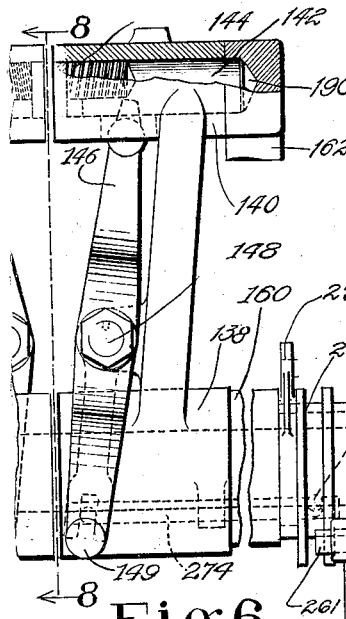
Fig. 6 is an enlarged rear elevation of a part of the mechanism shown in Figs. 4 and 5.

The jack mechanism will now be described. This is also largely old and is shown substantially as in the Baxter Patent 1,239,664, Sept. 11, 1917. The rock-shaft 80 has two forwardly projecting arms 132 with segmental slots 134. Above the rock-shaft 80 is a shaft 136 on which are mounted two sleeves 138 with integral arms 140 (Figs. 4, 5 and 6). Heads at the upper ends of these arms carry horizontally sliding bolts 142 normally pressed outward by the springs 144, and retractible by levers 146 pivoted at 148 on the arms 140 and operated by a wedge 150 on the cam disk which comes around and hits their lower ends 149 at the termination of a cycle. The sleeves 138 have each a forwardly projecting arm 152 with a circular slot 154. The design is such that when the machine has been stopped at the end of a cycle, the slots 154 and 134 are concentric. They are joined by a link 156 pivoted at its ends to blocks sliding in the slots. This link is linked to the main frame by a link 158 pivoted at about its middle. The sleeves 138 are thus rocked by oscillation of the shaft 80, and their amplitudes of oscillation can be independently adjusted by swinging the links 156 about their pivots in the link 158, thus altering the leverage between the arms 78 and 152. The means for this adjustment will be described later.

Pivotally mounted upon extensions 160 of the sleeves 138 are the toe posts 162 of the jacks. The heel posts 164 are pivoted at 166 (Fig. 3) on the toe post castings, for adjustment in accordance with the length of the shoe. This adjustment is accomplished by a screw 168 shouldered into the heel post and threaded into a pivoted split lug 170 on the toe post. This lug is tightened by a screw 172. The heel post casting extends beyond the pivot 166, as at 174. A link 176 connects this extension with a bell crank 178 pivoted at 180 on the toe post. The other arm of the bell crank is pivoted at 182 to a link 184 running down under the shaft 136 and up on the other side to the upper end of the link 156. This link is in two parts and a screw 186, threaded in one and shouldered in the other, permits an adjustment of its length. When the heel post is swung about the pivot 166 to fit the length of the shoe, the parts just described will move the link 156 in the segmental slots 134, 154, and the parts are so designed that the length of swing of the arm 152 is thus made proportional to the shoe length. Owing to the concentricity of the slots at the beginning of the cycle, this adjustment does not move the toe post.

The toe post has an arcuate extension or guard plate 188 against which the bolt 142 slides as the toe post is rotated on the extension 160 and has a hole 190 adapted to receive the bolt when the jack is thrown up into operative position, thus locking the toe post and the arm 140 together, until the end of the cycle, when they are again unlocked by the wedge 150 and the jack falls toward the operator on to the stop 192.

All of the above described mechanism has been known prior to the present invention and will be found substantially as shown, in the patents cited.

In prior sole leveling machines of this type the speed of the main shaft 20 remains constant irrespective of variations in the sizes of the shoes operated upon and as it takes one complete rotation of the main shaft to accomplish the leveling of a sole, it takes as much time to operate upon the sole of a small sized shoe as upon a large one and also the soles of different sizes of shoes are not uniformly leveled since the same amount of work or leveling energy is applied on the soles irrespective of the sizes thereof. In order to improve these features of said prior sole leveling machines, mechanism is provided in the illustrated machine whereby the speed of the main shaft is automatically varied inversely in accordance with variations in the area of the soles of the shoes operated upon.

The main shaft 20 is connected to the main driving shaft 192 through variable speed mechanism comprising, in the illustrated machine, an adjustable throw eccentric device which is controlled by the adjustment of the jacks to accommodate different sizes of shoes. This variable speed mechanism comprises three cams or eccentrics 194 (Figs. 10, 11 and 12) which are secured in progressive relation one hundred and twenty degrees apart to a shaft 196 which is constantly driven by the driving shaft 192 through a belt which passes over pulleys on said shafts. The eccentrics 194 are severally engaged by pairs of diametrically oppositely disposed rolls 198 mounted on annular members 200 surrounding the shaft 196. The annular members 200 are provided with hubs or reduced portions 202 on which are loosely mounted straps 204 forming the rear ends of arms 206. The arms 206 are pivotally connected to the upper ends of upstanding levers 208, the lower ends of which are pivoted on a rod 210 secured to the frame of the machine. The arms 206 are provided with short upstanding arms 212 the ends of which are connected by links 214 with the driving members 216 of Horton clutches 218 of a common type, the driven members of which are secured to a shaft 220 journaled in bearings in the frame of the machine. The annular members 200 are provided with forwardly projecting arms 222 which are utilized to change simultaneously the positions of the rolls 198 circumferentially of the eccentrics 194 and thereby vary the speed of rotation imparted to the clutch carrying shaft 220. It will be understood that when the arms 222 are swung upwardly from the positions shown in Figs. 11 and 12, to bring the rolls 198 toward the axis of the arm 206, the speed of the clutch shaft 220 is increased and that by moving the arms 222 downwardly the speed of the clutch shaft will be decreased. By moving the line joining two opposite rolls 198 into substantial perpendicularity to the plane containing the axis of the shaft 196 and the pivotal connections of the arms 212 and links 214, the variable speed mechanism will be adjusted to neutral position so that no movement will be imparted to the clutch shaft 220. The progressive arrangement of the parts of the mechanism causes the shaft 220 to be continuously rotated when the arms 222 are moved out of neutral position. The clutch shaft 220 drives the main shaft 20 through a pinion 224 carried thereby which meshes with the gear 24 secured to the main shaft.

In order to move the arms 222 to vary the speed of the main shaft and to bring the main shaft to rest when desired, the ends of the arms are pivotally connected to a rod 226 secured at its ends to lugs 228 projecting from a yoke 230 pivotally mounted on the shaft 196. The arm 222 is substantially perpendicular to the line joining its associated rolls 198 and the described construction enables the rolls 198 to support the elements 200, 202, 204, 206 on the eccentrics. The cross bar 232 of the yoke 230 is provided with a rearwardly projecting arm 234 the upper surface of which is provided with rack teeth 236 arranged concentrically to the shaft 196. The rack teeth 236 operatively engage rack teeth formed on the rear end of a rod 238 extending longitudinally of the machine and mounted to slide in suitable bearings therein. The forward end of the rod 238 (Figs. 1 and 3) is provided with rack teeth which engage a segmental gear 240 secured to the left end of a transverse shaft 242 journaled in the frame of the machine. At opposite ends of the shaft 242 are secured segmental gears 244 which engage rack teeth formed on control bars 246 which are mounted to slide longitudinally of the machine.

The control bars 246 are thus so connected through the shaft 242 that a longitudinal movement of one of them will impart a corresponding movement to the other and that by thus moving either of the control bars the speed of rotation of the main or cam shaft 20 will be varied. Their functions, generally, are as follows: The control bars are associated respectively with the two shoe supporting jacks in such manner that when either of the jacks is adjusted to accommodate the size of shoe to be operated upon and the jack is moved into operative position, the bars are adjusted to cause the desired variation in the speed of rotation of the cam shaft. In order that the actuation of a jack during the leveling operation shall not affect the speed of operation of the cam shaft 20, the control bars are disconnected from the jack and are locked in position when the jack has reached its operative position. When the operating jack supporting the finished shoe is thrown out of operation, the control bars are unlocked and in case the other jack is not simultaneously brought into operative position, the variable speed mechanism will be brought in neutral position stopping the rotation of the cam shaft in a predetermined angular position. The rotation of the main shaft is automatically initiated upon moving a jack into operative position. As the cam shaft makes a single revolution during each leveling operation, such automatic starting and stopping of the shaft ensures that the leveling operations will start and end at a definite point on the soles of the shoes.

Figure 7:
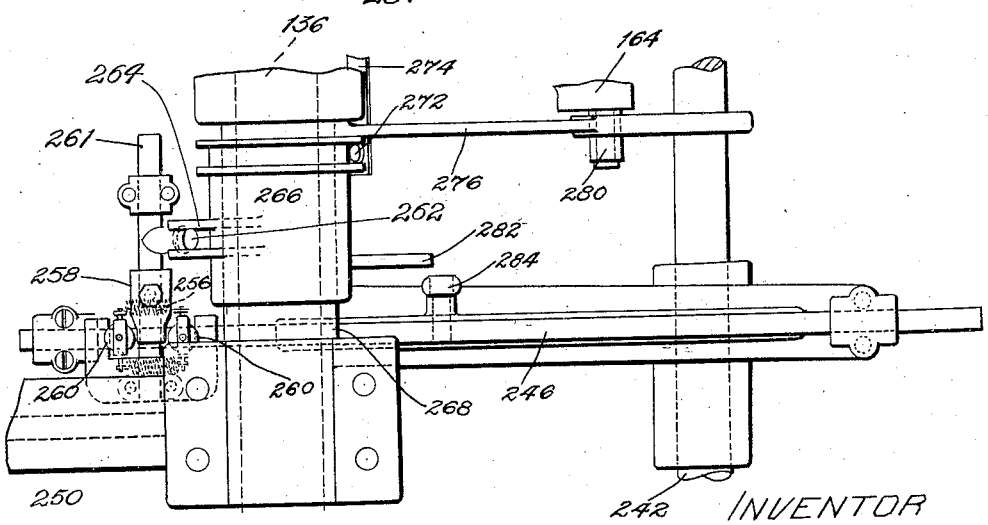
Fig. 7 is a plan of the same.

To lock the control bars in position at the proper times, a locking device 248 is associated with each bar. (See Figs. 3, 6 and 7). Each of these locking devices comprises a pair of cramping plates 250 provided with squared apertures through which the control bars extend. The lower ends of the cramping plates are urged against upstanding lugs 252 on the frame of the machine by coiled springs 254, and the upper ends of the cramping plates are urged toward each other to lock the control bars by means of coiled springs 256 having their ends connected to the cramping plates. The control bars are unlocked by parallelizing the cramping plates, which is done by the engagement of a pair of oppositely disposed wedge blocks 258 with rolls 260 mounted on the upper ends of the cramping plates.

Figure 8:
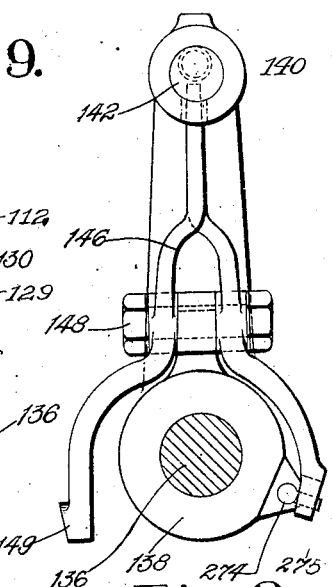
Fig. 8 is a section on the line 8—8 of Fig. 6.

The wedge blocks 258 are secured to transverse rods 261 mounted to slide in bearings in the frame of the machine. Each of the rods 261 is provided with a stud or roll 262 which engages a groove formed by two segmental plates 264 projecting from a sleeve 266 (of which there are two, one corresponding to each jack) mounted to slide and turn on the shaft 136 and located adjacent the outer sides of the jacks respectively. The sleeves 266 are further provided with grooved collars 270 which are engaged by studs or rolls 272, shown best in Figs. 6 and 7, secured to the outer ends of slidable rods 274 on the front side of the shaft 136, the inner ends of which rods are pivotally connected to the lower ends of the arms 275 of the levers 146. These levers are bifurcated as shown in Fig. 8 and straddle the shaft 136.

The sleeves 266 are operatively connected with the jacks by arms 276 projecting forwardly from the sleeves and provided with cam slots 278 engaged by axially elongated rolls 280 carried by the heel rests 164 of the jacks. The sleeves 266 are also provided with downwardly projecting arms 282 the free ends of which are adapted to engage with pins 284 projecting inwardly from the control bars 246. When one of the levers 146 is actuated by the wedge 150 carried by the cam disk 22 to permit a jack to drop into inoperative position as previously described, the front branch of the lever shifts one of the sleeves 266 outwardly a sufficient distance to cause the wedge block 258 connected therewith to unlock the locking device of the associated control bar. Prior to the unlocking of the locking device, however, the free end of the arm 282 is carried by the sleeve 266 to a position directly back of the pin 284 on the control bar which is carried backward into contact with the arm 282 as soon as the bar is unlocked by a weight 288 connected to the yoke 228 by means of a cord 290 which passes over a guide pulley 292. When a jack swings downwardly into inoperative position the corresponding sleeve 266 and arm 282 are rotated downward by the arm 276 and roll 280 connecting the jack and sleeve, and when both jacks are in inoperative position the variable speed mechanism is brought to neutral position by the weight. When one of the jacks is in inoperative position and is adjusted to the size of the shoe to be operated upon, the position of the lower end of the arm 282 is thereby adjusted by the cam slot 278 so that when the jack is brought into operative position the arm 282 acts through the pin 284 to move the control bars and thereby adjust the variable speed mechanism. When the bolt 142 associated with that jack snaps into the socket 190 in the segmental guard plate 188 of the jack, the connecting lever 146 is actuated to retract the sleeve 266 and the wedge block 258 of the locking device to permit the coiled spring 256 to actuate the cramping plates to lock the control bars in their adjusted position. This movement of the lever 146, by shifting the sleeve 266 along the bushing 268, carries the lower end of the arm 282 out of the path of the pin 284 of the control bar so that during the effective operation of the machine, the jack is disconnected from the control bars. The cam slots 278 are so shaped that when the adjustment of the variable speed mechanism is effected by adjusting a jack in accordance with the size or length of the shoe to be operated upon, the desired adjustment is obtained of the variable speed mechanism in accordance with the desired characteristic of the sole of the shoe, so that the jack moves more slowly when leveling a long shoe than when leveling a short one. The design of the cam slot is more or less arbitrary. The setting of the control mechanism, whatever theory it is built on, is really a function only of the length of the shoe. For example, the speed may be made proportional to the length so as to maintain a uniform velocity or to areas of a set of soles of the same marked width, by a proper design of the cam slot. The amount of leveling energy expended can thus be adjusted in accordance with the area to be treated, by which is not meant necessarily a strict proportionality but a practical, reasonable correspondence.

The jack throw adjustment is such to make the length of throw not only equal to the length of the shoe, but substantially proportional to it in all parts, so that assuming that we have a shoe the style of whose bottom corresponds to the design of the main jack operating cam, the long and short traverses of the leveling rolls will exactly fit the forepart and shank, properly locating the ball points in shoes of all sizes of that style. If the style of the bottom does not fit the design of the main jack cam, the auxiliary jack cam is brought into use in order to move the reversing point of the machine to the actual ball point of the shoe, and a change in adjustment will be required for every length in this case since the auxiliary jack cam mechanism shown works arithmetically rather than geometrically, that is, it alters the fundamental condition of things by adding a constant quantity to it instead of adding a constant percentage to it. The leveling rolls will reach the ball points of the shoes at the same time fraction of the operating cycle in all cases (unless the auxiliary jack cam mechanism has been designed to affect this time). The roll tipping mechanism will alter the roll tip at these same fractional cycle times so that the roll tip and the ball point reversal or ball point traverse are kept together.

The mechanism which regulates the amount of leveling energy applied to the soles effects this purpose by accelerating or decelerating the main drive so that it does not affect any of the correlations just mentioned, this constituting one important feature of the invention. It is to be noted also that what we may call the zero point of the machine is at the toe tip at the instant of beginning or ending a leveling cycle, and all the adjustments are so arranged that they do not affect this point.

Having thus described my invention, what I claim as new and desire to secure by Letters Patent of the United States is:—

1. A sole pressing machine having, in combination, a sole pressing device, a shoe supporting jack, mechanism comprising a main drive for relatively actuating the pressing device and jack to press the sole of a shoe on the jack, and means actuated by relatively moving the pressing device and jack into operative position for adjusting the speed of the main drive in correspondence with the length of the sole to be operated upon, the extent of the said adjustment being controlled by the adjustment of the jack to fit the shoe.

2. A sole pressing machine having, in combination, a sole traversing pressing device, a shoe supporting jack arranged for adjustment to fit shoes of different sizes, mechanism comprising a main drive for relatively actuating the pressing device and jack to traverse the sole of a shoe on the jack, and means controlled by the said adjustment of the jack for adjusting the speed of the main drive in correspondence with the length of the sole to be operated upon.

3. A sole leveling machine having, in combination, a sole leveling device, a shoe supporting jack, mechanism for relatively actuating the leveling device and jack to level the sole of a shoe placed on the jack, and means actuated by relatively moving the leveling device and jack into operative position for adjusting the speed of operation of said mechanism in quantitative relation to the area of the sole to be operated upon.

4. A sole leveling machine having, in combination, a sole leveling device, a shoe supporting jack, means for adjusting the jack to accommodate shoes of different sizes, mechanism for relatively actuating the leveling device and jack to level the sole of a shoe placed on the jack, and a speed controlling device controlled by said adjustment of the jack for adjusting the speed of operation of said mechanism.

5. A sole leveling machine having, in combination, a sole leveling device, a shoe supporting jack, means for adjusting the jack to accommodate shoes of different sizes, means for relatively actuating the leveling device and jack to level the sole of a shoe placed on the jack, and means comprising a variable speed mechanism controlled by said adjustment of the jack for timing the cycle of the actuating means.

6. A sole leveling machine having, in combination, a sole leveling device, a pivotally mounted shoe supporting jack, means for adjusting the jack to accommodate shoes of different sizes, mechanism comprising a cam for oscillating the jack on its pivot relatively to the leveling device to level the sole of a shoe placed on the jack, and means controlled by said adjustment of the jack for varying the speed of operation of said cam.

7. A sole leveling machine having, in combination, a sole leveling device, a shoe supporting jack, mechanism for relatively actuating the sole leveling device and jack to level the sole of a shoe placed on the jack, means for throwing the jack out of operative position at the completion of the leveling operation, means for adjusting the jack to accommodate shoes of different sizes, and means whereby the adjustment of the jack effects the adjustment of the speed of operation of said mechanism when the jack is returned to operative position.

8. A sole leveling machine having, in combination, a sole leveling device, a shaft, a shoe supporting jack mounted on the shaft, mechanism for actuating the shaft to move the jack relatively to the leveling device to level the sole of a shoe placed on the jack, means for adjusting the speed of operation of said mechanism, means for disconnecting the shaft and jack and for simultaneously connecting the jack with said adjusting means at the completion of the leveling operation, and means for adjusting the jack to accommodate shoes of different sizes, controlling said speed adjusting means.

9. A sole leveling machine having, in combination, a sole leveling device, a shoe supporting jack, mechanism for relatively actuating the leveling device and jack to level the sole of a shoe placed on the jack, means for stopping said mechanism at the completion of the leveling operation and for throwing the jack out of operative position, and means for positively throwing said mechanism into operation actuated by movement of the jack into operative position.

10. A sole leveling machine having, in combination, a sole leveling device, a shoe supporting jack, mechanism for relatively actuating the leveling device and jack to level the sole of a shoe placed on the jack, a variable speed mechanism for driving said mechanism for relatively actuating the leveling device and jack, and means for adjusting the jack to accommodate shoes of different sizes and for simultaneously setting the variable speed mechanism to vary the speed thereof in inverse relation to the length of the shoe.

11. A sole leveling machine having, in combination, sole leveling devices, a pair of shoe supporting jacks, mechanism for relatively actuating the leveling devices and jacks to level the soles of shoes placed on the jacks, means for throwing the jacks out of operative position at the completion of their respective leveling operations, means for automatically stopping the machine when both jacks have been thrown out of operative position, and positively acting means for starting the machine actuated by throwing a jack into operative position.

12. A sole leveling machine having, in combination, a sole leveling device, a shoe supporting jack, means for relatively actuating the leveling device and jack to level the sole of a shoe placed on the jack, and means actuated by relatively moving the leveling device and jack into operative relation for varying the amount of leveling energy applied on the sole.

13. A sole leveling machine having, in combination, a sole leveling device, a shoe supporting jack, means for relatively actuating the leveling device and jack to level the sole of a shoe placed on the jack and means controlled by the adjustment of the jack to the shoe for varying the amount of leveling energy applied on the sole.

14. A sole leveling machine having, in combination, a sole leveling device, a shoe supporting jack, mechanism for relatively actuating the leveling device and jack to level the sole of a shoe placed on the jack, and a variable throw eccentric adjusted by relatively moving the leveling device and jack into operative relation for adjusting the speed of operation of said mechanism.

15. A sole leveling machine having, in combination, a sole leveling device, a shoe supporting jack, mechanism for relatively actuating the leveling device and jack to level the sole of a shoe placed on the jack, a variable speed mechanism for actuating said mechanism for relatively actuating the leveling device and jack, connections between the variable speed mechanism and the jack for controlling the variable speed mechanism by adjustment of the jack, and means for locking said connections from movement when the jack is moved into operative position.

16. A sole leveling machine having, in combination, a sole leveling device, a shoe supporting jack, mechanism for relatively actuating the leveling device and jack to level the sole of a shoe placed on the jack, a variable speed drive for said mechanism, connections between the variable speed drive and the jack whereby the adjustment of the jack effects the adjustment of the variable speed drive, means for locking said connections from movement when the jack is in operative position, and means for unlocking said connections when the jack is moved out of operative position.

17. A sole leveling machine having, in combination, a vibrating leveling roll, a shoe supporting jack mechanism operating automatically to change the relative longitudinal position and lateral inclination of the roll and jack to level the sole of a shoe placed on the jack, and means for automatically adjusting said mechanism to cause the amount of the leveling energy applied on the sole to vary with the area of the sole.

18. A sole leveling machine having, in combination, a vibrating leveling roll, a shoe supporting jack, mechanism operating automatically to change the relative longitudinal position and lateral inclination of the roll and jack to level the sole of a shoe placed on the jack, and means actuated by relatively moving the roll and jack into operative relation for adjusting said mechanism to cause the amount of leveling energy applied on the sole to increase with the area of the sole.

19. A sole leveling machine having, in combination, a vibrating leveling roll, a shoe supporting jack, mechanism operating automatically to change the relative longitudinal position and lateral inclination of the roll and jack to level the sole of a shoe placed on the jack, means for adjusting the machine to accommodate shoes of different sizes, and means controlled by said adjustment of the machine for varying the speed of operation of said mechanism.

20. A sole leveling machine having, in combination, a vibrating leveling roll, a shoe supporting jack, mechanism operating automatically to change the relative longitudinal position and lateral inclination of the roll and jack to level the sole of a shoe placed on the jack, and means actuated by relatively moving the roll and jack into operative relation for varying the speed of operation of said mechanism.

21. A sole leveling machine having, in combination, a sole leveling device, a shoe supporting jack, means for adjusting the jack to accommodate shoes of different sizes, mechanism operating automatically to change the relative longitudinal position and lateral inclination of the roll and jack to level the sole of a shoe placed on the jack, and means controlled by said adjustment of the jack for varying the speed of operation of said mechanism.

22. A sole leveling machine having, in combination, a sole leveling device, a shoe supporting jack adjustable for different shoes, mechanism for relatively actuating the leveling device and jack to level the sole of a shoe placed on the jack, a variable speed drive for said mechanism, means for adjusting the speed of said variable speed drive, means for connecting the jack with said adjusting means whereby the adjustment of the jack regulates the adjustment of the variable speed drive, and means for locking the adjusting means in position during the effective operation of the jack.

23. A sole leveling machine having, in combination, a sole leveling device, a shoe supporting jack adjustable for shoes of different lengths, mechanism for relatively actuating the leveling device and jack to level the sole of a shoe placed on the jack, a variable speed drive for said mechanism, means for adjusting the variable speed drive, means for connecting the jack with said adjusting means when the jack is out of operative position whereby the adjustment of the jack to the length of the shoe effects the adjustment of the variable speed drive, and means for disconnecting the jack and said adjusting means when the jack is moved into operative position.

24. A sole leveling machine having, in combination, a sole leveling device, a shoe supporting jack, mechanism for relatively actuating the leveling device and jack to level the sole of a shoe placed on the jack, a variable speed drive for said mechanism, means for adjusting the variable speed drive, means for connecting the jack and said adjusting means adjustably when the jack is thrown out of operative position whereby the movement of the jack into operative position actuates said adjusting means, and a locking device for locking the adjusting means in position when the jack is moved into operative position.

25. A sole leveling machine having, in combination, a sole leveling device, a shoe supporting jack, mechanism for relatively actuating the leveling device and jack to level the sole of a shoe placed on the jack, a setting means adjustable for determining the speed of operation of said mechanism and means for simultaneously adjusting the jack in accordance with the size of the shoe to be operated upon, and means for locking said setting means in position during the effective operation of the machine.

26. A sole leveling machine having, in combination, a sole leveling device, a shoe supporting jack, mechanism for relatively actuating the leveling device and jack to level the sole of a shoe placed on the jack, and an adjustable speed varying device controlling said mechanism and adjustable by setting the shoe in the jack.

27. A sole leveling machine having, in combination, a sole leveling device, a shoe supporting jack, mechanism for relatively actuating the leveling device and jack to level the sole of a shoe placed on the jack, comprising a main cam shaft, and connections adjustable by the fitting of a shoe on the jack for varying the speed of the cam shaft.

28. A sole leveling machine having, in combination, a sole leveling roll, a shoe supporting jack, mechanism for relatively actuating the leveling roll and jack to level the sole of a shoe placed on the jack, comprising a main cam shaft, and means adjusted by the relative movement of the jack and roll into operative relation for varying the speed of the cam shaft.

29. A sole leveling machine having, in combination, a sole leveling device, a shoe supporting jack, mechanism for relatively actuating the leveling device and jack to level the sole of a shoe placed on the jack, means for varying the amplitude of relative movement of the leveling device and jack to accommodate shoes of different sizes, means for adjusting the jack to accommodate shoes of different sizes, and connections controlled by said adjustment of the jack for varying the speed of operation of said mechanism.

30. A sole leveling machine having, in combination, a sole leveling device, a shoe supporting jack, means for adjusting the jack to accommodate shoes of different sizes, means for relatively actuating the leveling device and jack to level the sole of a shoe placed on the jack comprising an adjustable connection for adapting the amplitude of relative actuation to the length of the shoe, and means comprising a variable speed mechanism controlled by said adjustment of the jack for timing the cycle of the actuating means in direct relation to the length of the shoe.

31. A shoe leveling machine comprising a leveling tool, a shoe supporting jack, means to traverse the tool and jack relatively so that the tool shall operate on the shoe bottom, means automatically causing this traverse to extend, in different traverses on the same shoe, at one time from the toe end of the shoe to a rear portion thereof, and at another time over a shorter path terminated by the junction of the forepart and shank, and means for adjusting the time durations of said traverses in accordance with the length of the shoe being treated to effect substantially uniform expenditure of energy on corresponding portions of the treated surfaces of different shoes irrespective of the lengths of the shoes, the adjustment of said last-named means being controlled by the adjustment of the jack to fit the shoe.

32. A shoe leveling machine comprising a leveling tool, a shoe supporting jack, means to traverse the tool and jack relatively so that the tool shall operate on the shoe bottom means automatically causing this traverse to extend, in different traverses on the same shoe, at one time from the toe end of the shoe to a rear portion thereof, and at another time over a shorter path terminated by the junction of the forepart and shank, and means operated by throwing the jack and leveling tool into cooperative relation for adjusting the time durations of said traverses in accordance with the length of the shoe being treated to effect substantially uniform expenditure of energy on corresponding portions of the treated surfaces of different shoes irrespective of the lengths of the shoes.

33. A shoe leveling machine comprising a leveling tool, a shoe supporting jack, means to traverse the tool and jack relatively so that the tool shall operate on the shoe bottom, means automatically causing this traverse to extend, in different traverses on the same shoe, at one time from the toe end of the shoe to the rear end of the shank, and at another time over a shorter path terminated by the junction of the forepart and shank, and means rendered operable by placing the leveling tool and shoe in operative relation for adjusting the time durations of said traverses in directly varying relation with the length of the shoe being treated, while preserving the length ratio of the traverses.

34. A shoe leveling machine comprising a leveling tool, a shoe supporting jack, means to traverse the tool and jack relatively so that the tool shall operate on the shoe bottom, means automatically causing this traverse to extend, in different traverses on the same shoe, at one time from the toe end of the shoe to the rear end of the shank, and at another time over a shorter path terminated by the junction of the forepart and shank, and means comprising a speed regulating device adjusted through the fitting of the shoe on to the jack for adjusting the time durations of said traverses in directly varying relation with the length of the shoe being treated, while preserving the length ratio of the traverses.

35. A shoe leveling machine comprising a leveling tool, a shoe supporting jack arranged for adjustment to fit a shoe, means to traverse the tool and jack relatively so that the tool shall operate on the shoe bottom, means automatically causing this traverse to extend, in different traverses on the same shoe, at one time from the toe end of the shoe to the rear end of the shank, and at another time over a shorter path terminated by the junction of the forepart and shank, and means comprising a speed control device for maintaining a substantially uniform velocity of the tool relatively to the shoe, while preserving the proper location of the end of the short traverse, the action of said last-named means being quantitatively determined by the adjustment of the jack to fit the shoe.

36. A shoe leveling machine comprising a leveling tool, a shoe supporting jack arranged for adjustment to fit the shoe, means to traverse the tool and jack relatively so that the tool shall operate on the shoe bottom, means automatically causing this traverse to extend, in different traverses on the same shoe, at one time from the toe end of the shoe to the rear end of the shank and at another time over a shorter path terminated by the junction of the forepart and shank, means for adjusting the lengths of said traverses to the length of the shoe being treated, while preserving their ratio, and means comprising a speed regulation device adjusted by virtue of the adjustment of the jack to the length of the shoe for adjusting the time duration of said traverses in accordance with the length of the shoe.

37. A shoe leveling machine comprising a leveling tool, a shoe supporting jack arranged for adjustment to fit the shoe, means to traverse the tool and jack relatively so that the tool shall operate on the shoe bottom, means automatically causing this traverse to extend, in different traverses on the same shoe, at one time from the toe end of the shoe to the rear end of the shank and at another time over a shorter path terminated by the junction of the forepart and shank, means for adjusting the lengths of said traverses to the length of the shoe being treated, while preserving their ratio, and means comprising a variable speed transmission device thrown into operation by placing the shoe and leveling tool in cooperative relation for adjusting the time duration of said traverses in accordance with the length of the shoe.

38. A shoe leveling machine comprising a leveling tool, a shoe supporting jack arranged for adjustment to the length of the shoe, means to traverse the tool and jack relatively so that the tool shall operate on the shoe bottom, means automatically causing this traverse to extend, in different traverses on the same shoe, at one time from the toe end of the shoe to the rear end of the shank and at another time over a shorter path terminated by the junction of the forepart and shank, means for adjusting the ratio of the lengths of said traverses in accordance with the style of the shoe being treated, to make the end of the short traverse correspond to the break between the forepart and shank, means for adjusting the absolute lengths of the traverses to the length of the shoe, while preserving their style-ratio, and means for preserving a substantially constant velocity of traverse irrespective of the length of the shoe comprising a regulating mechanism acting on the traversing means and controlled through the adjustment of the jack to the shoe.

39. A shoe leveling machine comprising a leveling tool, a shoe supporting jack arranged for adjustment to the length of a shoe, means to traverse the tool and jack relatively so that the tool shall operate on the shoe bottom, means automatically causing this traverse to extend in different traverses on the same shoe, at one time from the toe end of the shoe to the rear end of the shank and at another time over a shorter path terminated by the junction of the forepart and shank, means for adjusting the ratio of the lengths of said traverses in accordance with the style of the shoe being treated, to make the end of the short traverse correspond to the break between the forepart and shank, means for adjusting the absolute lengths of the traverses to the length of the shoe, while preserving their style-ratio, and means comprising a drive regulator set by means of the adjustment of the jack to the shoe for maintaining substantially uniform the velocities of the traverses irrespective of the length of the shoe, to make the expenditure of energy on corresponding portions of shoes of different lengths substantially uniform.

40. A shoe leveling machine comprising a leveling tool, a shoe supporting jack arranged for adjustment to the length of a shoe, means to traverse the tool and jack relatively so that the tool shall operate on the shoe bottom, means automatically causing this traverse to extend, in different traverses on the same shoe, at one time from the toe end of the shoe to the rear end of the shank and at another time over a shorter path terminated by the junction of the forepart and shank, means for adjusting the ratio of the lengths of said traverses in accordance with the style of the shoe being treated, to make the end of the short traverse correspond to the break between the forepart and shank, means for adjusting the absolute lengths of the traverses to the length of the shoe, while preserving their style-ratio, and means comprising a drive regulator actuated by throwing the jack and leveling tool into operative relation for maintaining substantially uniform the velocities of the traverses irrespective of the length of the shoe, to make the expenditure of leveling energy on corresponding portions of shoes of different lengths substantially uniform.

41. A shoe pressing machine having a pressing device, a shoe supporting jack, a variable speed mechanism for relatively actuating the pressing device and the jack to press a shoe on the jack, said mechanism comprising a lost motion device for maintaining the jack out of operative relation to the mechanism, and a latching means for holding it in operative relation to said mechanism, when desired, and a main power device for actuating said mechanism, said mechanism being constructed and arranged to come to zero speed at the end of a pressing operation without disturbance of the main power device, and to be restored to operative speed when the jack is latched to the said mechanism at the beginning of the next operation.

In testimony whereof I have signed my name to this specification.

ALFRED B. FOWLER.